US011110655B2

(12) United States Patent
Budge et al.

(10) Patent No.: US 11,110,655 B2
(45) Date of Patent: Sep. 7, 2021

(54) SYSTEM, PRINT HEAD, AND COMPACTOR FOR CONTINUOUSLY MANUFACTURING COMPOSITE STRUCTURE

(71) Applicant: CC3D LLC, Coeur d'Alene, ID (US)

(72) Inventors: Trevor David Budge, Coeur d'Alene, ID (US); Kenneth Lyle Tyler, Coeur d'Alene, ID (US); Colin Hugh Hambling, Medina, WA (US)

(73) Assignee: Continuous Composites Inc., Coeur d'Alene, ID (US)

( * ) Notice: Subject to any disclaimer, the term of this patent is extended or adjusted under 35 U.S.C. 154(b) by 414 days.

(21) Appl. No.: 16/184,228

(22) Filed: Nov. 8, 2018

(65) Prior Publication Data

US 2019/0202121 A1  Jul. 4, 2019

Related U.S. Application Data

(60) Provisional application No. 62/611,922, filed on Dec. 29, 2017.

(51) Int. Cl.
*B29C 64/209* (2017.01)
*B29C 64/255* (2017.01)
(Continued)

(52) U.S. Cl.
CPC ............ *B29C 64/209* (2017.08); *B29C 64/10* (2017.08); *B29C 64/118* (2017.08);
(Continued)

(58) Field of Classification Search
CPC ... B29C 64/209; B29C 64/165; B29C 64/118; B29C 70/384; B29C 64/393;
(Continued)

(56) References Cited

U.S. PATENT DOCUMENTS 3,286,305 A   11/1966 Seckel
3,809,514 A   5/1974 Nunez
(Continued)

FOREIGN PATENT DOCUMENTS

CN   107962774 A   4/2018
DE   4102257 A1   7/1992
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Leith S Shafi
(74) *Attorney, Agent, or Firm* — Ryan C. Stockett

(57) ABSTRACT

A compactor is disclosed for use with an additive manufacturing print head. The compactor may include a housing connectable to the additive manufacturing print head. The compactor may also include a compacting wheel, and at least one spring disposed in the housing and configured to exert an axial force on the compacting wheel. The compactor may further include a piston moveable to adjust a distance between the housing and the compacting wheel.

18 Claims, 2 Drawing Sheets

(51) Int. Cl.
  *B33Y 10/00* (2015.01)
  *B33Y 30/00* (2015.01)
  *B29C 64/10* (2017.01)
  *B29C 64/118* (2017.01)
  *B33Y 70/00* (2020.01)
  *B29C 70/38* (2006.01)
  *B29C 64/165* (2017.01)
  *B33Y 50/02* (2015.01)
  *B29C 64/393* (2017.01)
  *B29K 105/08* (2006.01)
  *B29K 105/06* (2006.01)

(52) U.S. Cl.
  CPC .......... *B29C 64/165* (2017.08); *B29C 64/255* (2017.08); *B29C 64/393* (2017.08); *B29C 70/384* (2013.01); *B33Y 10/00* (2014.12); *B33Y 30/00* (2014.12); *B33Y 50/02* (2014.12); *B33Y 70/00* (2014.12); *B29K 2105/06* (2013.01); *B29K 2105/08* (2013.01)

(58) Field of Classification Search
  CPC ....... B29C 64/255; B29C 64/10; B29C 64/25; B29C 64/35; B29C 70/382; B29C 70/388; B29C 70/38; B33Y 70/00; B33Y 50/02; B33Y 10/00; B33Y 30/00; B33Y 40/00; B29K 2105/08; B29K 2105/06
  See application file for complete search history.

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,643,940 A | 2/1987 | Shaw et al. |
| 4,671,761 A | 6/1987 | Adrian et al. |
| 4,787,839 A | 11/1988 | Morse |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,936,861 A | 8/1999 | Jang et al. |
| 6,073,670 A * | 6/2000 | Koury ...................... B29C 70/16 156/425 |
| 6,153,034 A | 11/2000 | Lipsker |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 * | 10/2015 | Mark .................... B29C 64/209 |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2006/0048881 A1 * | 3/2006 | Evans .................. B29C 66/8362 156/64 |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0124120 A1 * | 5/2014 | Pham .................... B29C 70/38 156/64 |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2015/0024169 A1 | 1/2015 | Martin |
| 2015/0076732 A1 | 3/2015 | Kemmer et al. |
| 2015/0136455 A1 | 5/2015 | Fleming |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |

(56) References Cited

U.S. PATENT DOCUMENTS

| | | |
|---|---|---|
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1* | 2/2017 | Evans ............... B05D 3/068 |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0232681 A1 | 8/2017 | Xu et al. |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2017/0320242 A1* | 11/2017 | Kok ............... B29C 70/386 |
| 2018/0017499 A1* | 1/2018 | Monchalin ............ B29C 70/38 |
| 2019/0299542 A1* | 10/2019 | Webb ............... G01N 25/72 |
| 2019/0383759 A1* | 12/2019 | Johnson ............. B29C 70/38 |
| 2019/0389148 A1* | 12/2019 | Wadsworth ......... B29C 70/384 |

FOREIGN PATENT DOCUMENTS

| | | |
|---|---|---|
| EP | 2589481 B1 | 1/2016 |
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/ Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-805 (May 15, 2012).

International Search Report dated Feb. 11, 2019 for PCT/US2018/ 060054 to CC3D LLC Filed Nov. 9, 2018.

\* cited by examiner

SYSTEM, PRINT HEAD, AND COMPACTOR FOR CONTINUOUSLY MANUFACTURING COMPOSITE STRUCTURE

RELATED APPLICATIONS

This application is based on and claims the benefit of priority from U.S. Provisional Application No. 62/611,922 that was filed on Dec. 29, 2017, the contents of which are expressly incorporated herein by reference.

TECHNICAL FIELD

The present disclosure relates generally to a manufacturing system, a print head, and a compactor, and more particularly, to a compactor for use with an additive manufacturing print head and system.

BACKGROUND

Extrusion manufacturing is a known process for producing continuous structures. During extrusion manufacturing, a liquid matrix (e.g., a thermoset resin or a heated thermoplastic) is pushed through a die having a desired cross-sectional shape and size. The material, upon exiting the die, cures and hardens into a final form. In some applications, UV light and/or ultrasonic vibrations are used to speed the cure of the liquid matrix as it exits the die. The structures produced by the extrusion manufacturing process may have any continuous length, with a straight or curved profile, a consistent cross-sectional shape, and smooth surface finishes. Although extrusion manufacturing can be an efficient way to continuously manufacture structures, the resulting structures may lack the strength required for some applications.

Pultrusion manufacturing is a known process for producing high-strength structures. During pultrusion manufacturing, individual fiber strands, braids of strands, and/or woven fabrics are coated with or otherwise impregnated with a liquid matrix (e.g., a thermoset resin or a heated thermoplastic) and pulled through a stationary die where the liquid matrix cures and hardens into a final form. As with extrusion manufacturing, UV light and/or ultrasonic vibrations are used in some pultrusion applications to speed the cure of the liquid matrix as it exits the die. The structures produced by the pultrusion manufacturing process have many of the same attributes of extruded structures, as well as increased strength due to the integrated fibers. Although pultrusion manufacturing can be used to continuously manufacture high-strength structures, the resulting structures may lack the form (shape, size, precision, and/or surface texture) required for some applications. In addition, conventional pultrusion manufacturing may lack precise control over curing and the ability to dynamically change materials in the composite material during manufacture. Further, the variety of patterns and shapes integrated within the pultruded structures may be limited, thereby limiting available characteristics of the resulting structures.

Continuous fiber 3D printing (a.k.a., CF3D™) has recently been developed to address the shortcomings of extrusion and pultrusion manufacturing. CF3D involves the use of continuous fibers embedded within a matrix discharging from a moveable print head. The matrix can be a traditional thermoplastic, a powdered metal, a liquid resin (e.g., a UV curable and/or two-part resin), or a combination of any of these and other known matrixes. Upon exiting the print head, a head-mounted cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543, which issued to TYLER on Dec. 6, 2016.

Although CF3D™ provides for increased strength, compared to manufacturing processes that do not utilize continuous fiber reinforcement, improvements can be made to the structure and/or operation of existing systems. The disclosed additive manufacturing system and print head are uniquely configured to provide these improvements and/or to address other issues of the prior art.

The disclosed system is directed to addressing one or more of the problems set forth above and/or other problems of the prior art.

SUMMARY

In one aspect, the present disclosure is directed to a compactor for use with an additive manufacturing print head. The compactor may include a housing connectable to the additive manufacturing print head. The compactor may also include a compacting wheel, and at least one spring disposed in the housing and configured to exert an axial force on the compacting wheel. The compactor may further include a piston moveable to adjust a distance between the housing and the compacting wheel.

In another aspect, the present disclosure is directed to a print head for an additive manufacturing system. The print head may include a matrix reservoir configured to hold a supply of matrix, and a nozzle connected to an end of the matrix reservoir. The print head may also include a cure enhancer configured to expose a composite material being discharged from the nozzle to a cure energy, and a compactor located between the nozzle and the cure enhancer. The compactor may be configured to compact the composite material prior to exposure to the cure energy. The compactor may have a housing, a compacting wheel, and at least one spring disposed in the housing and configured to exert an axial force on the compacting wheel. The compactor may also have a piston moveable to adjust a distance between the housing and the compacting wheel.

In another aspect, the present disclosure is directed to a system for additively manufacturing a composite structure. The system may include a nozzle configured to discharge a continuous reinforcement at least partially coated with a matrix, a support configured to move the nozzle during discharging, and a compactor operatively connected to the nozzle and being adjustable to vary a compaction force exerted on the matrix-coated reinforcement discharging from the nozzle. The system may also include a cure enhancer configured to expose the matrix to a cure energy, and a scraper mounted between the compactor and the cure enhancer. The system may further include a sensor mounted at a side of the nozzle opposite the compactor and configured to generate a signal indicative of a surface characteristic of the composite structure, and a controller configured to selectively cause adjustment of the compactor based on the signal.

DETAILED DESCRIPTION

Figure 1:
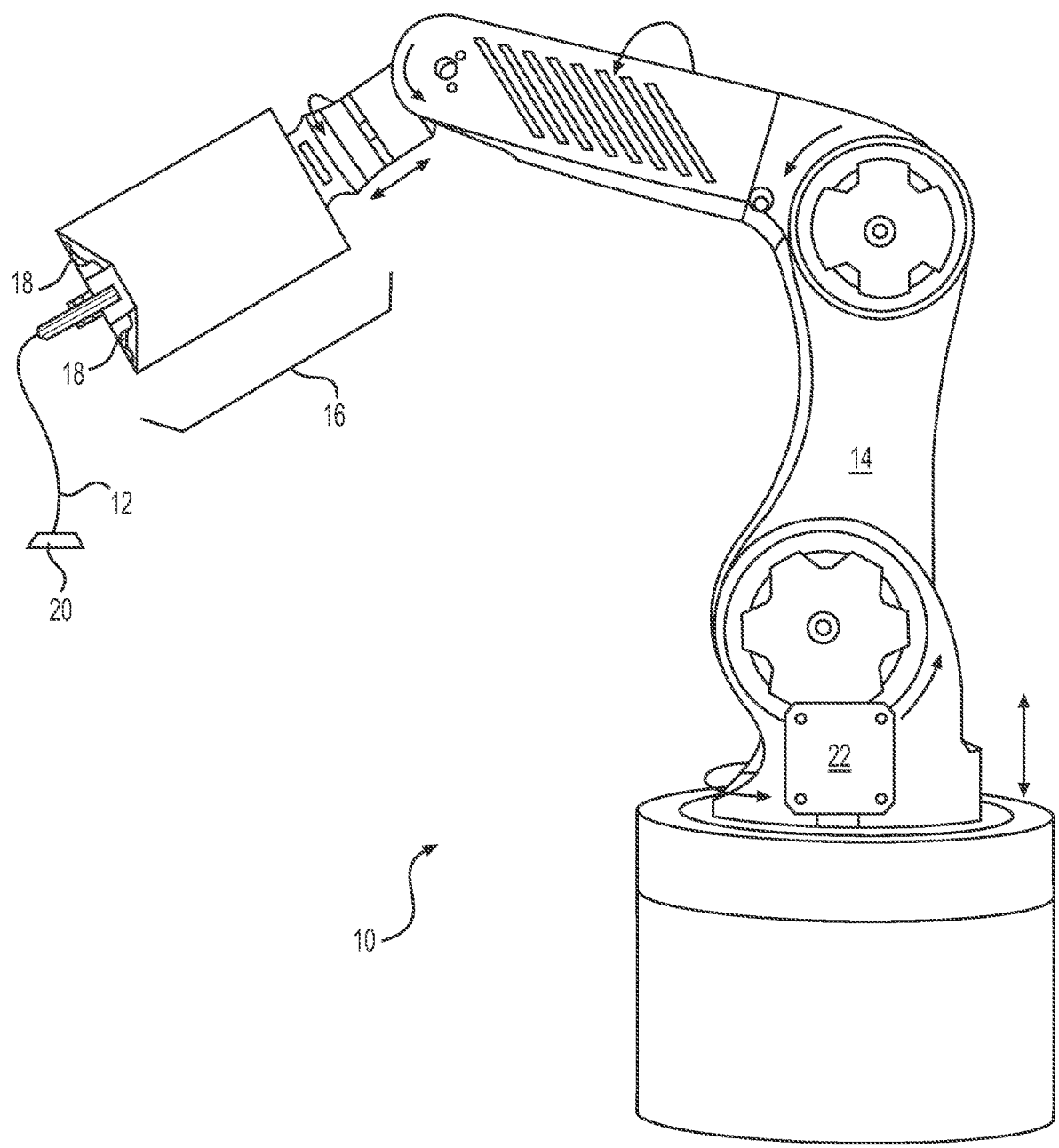
FIG. 1 is a diagrammatic illustration of an exemplary disclosed additive manufacturing system.

FIG. 1 illustrates an exemplary system 10, which may be used to continuously manufacture composite structures 12 having any desired cross-sectional shape (e.g., circular, rectangular, or polygonal). System 10 may include at least a support 14 and a head 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis (e.g., a trajectory) of structure 12 is three-dimensional. Support 14 may alternatively embody an overhead gantry or a hybrid gantry/arm also capable of moving head 16 in multiple directions during fabrication of structure 12. Although support 14 is shown as being capable of 6-axis movements, it is contemplated that any other type of support 14 capable of moving head 16 in the same or a different manner could also be utilized. In some embodiments, a drive may mechanically couple head 16 to support 14, and include components that cooperate to move portions of and/or supply power to head 16.

Head 16 may be configured to receive or otherwise contain a matrix material. The matrix material may include any type of matrix material (e.g., a liquid resin, such as a zero-volatile organic compound resin, a powdered metal, etc.) that is curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix material inside head 16 may be pressurized, for example by an external device (e.g., by an extruder or another type of pump—not shown) that is fluidly connected to head 16 via a corresponding conduit (not shown). In another embodiment, however, the pressure may be generated completely inside of head 16 by a similar type of device. In yet other embodiments, the matrix material may be gravity-fed into and/or through head 16. For example, the matrix material may be fed into head 16, and pushed or pulled out of head 16 along with one or more continuous reinforcements. In some instances, the matrix material inside head 16 may need to be kept cool and/or dark in order to inhibit premature curing or otherwise obtain a desired rate of curing after discharge. In other instances, the matrix material may need to be kept warm for similar reasons. In either situation, head 16 may be specially configured (e.g., insulated, temperature-controlled, shielded, etc.) to provide for these needs.

The matrix material may be used to coat any number of continuous reinforcements (e.g., separate fibers, tows, rovings, socks, and/or sheets of continuous material) and, together with the reinforcements, make up a portion (e.g., a wall) of composite structure 12. The reinforcements may be stored within (e.g., on one or more separate internal spools—not shown) or otherwise passed through head 16 (e.g., fed from one or more external spools 17—shown only in FIG. 2). When multiple reinforcements are simultaneously used, the reinforcements may be of the same material composition and have the same sizing and cross-sectional shape (e.g., circular, square, rectangular, etc.), or a different material composition with different sizing and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that are at least partially encased in the matrix material discharging from head 16.

The reinforcements may be exposed to (e.g., at least partially coated with) the matrix material while the reinforcements are inside head 16, while the reinforcements are being passed to head 16, and/or while the reinforcements are discharging from head 16. The matrix material, dry reinforcements, and/or reinforcements that are already exposed to the matrix material may be transported into head 16 in any manner apparent to one skilled in the art. In some embodiments, a filler material (e.g., chopped fibers) may be mixed with the matrix material before and/or after the matrix material coats the continuous reinforcements.

One or more cure enhancers (e.g., a UV light, an ultrasonic emitter, a laser, a heater, a catalyst dispenser, etc.) 18 may be mounted proximate (e.g., within, on, or adjacent) head 16 and configured to enhance a cure rate and/or quality of the matrix material as it is discharged from head 16. Each cure enhancer 18 may be controlled to selectively expose portions of structure 12 to energy (e.g., UV light, electromagnetic radiation, vibrations, heat, a chemical catalyst, etc.) during the formation of structure 12. The energy may increase a rate of chemical reaction occurring within the matrix material, sinter the material, harden the material, or otherwise cause the material to cure as it discharges from head 16. In the depicted embodiments, cure enhancer 18 includes multiple LEDs (e.g., 6 different LEDs) that are equally distributed about a center axis of head 16. However, it is contemplated that any number of LEDs or other energy sources could alternatively be utilized for the disclosed purposes and/or arranged in another manner (e.g., unequally distributed). The amount of energy produced by cure enhancer 18 may be sufficient to cure the matrix material before structure 12 axially grows more than a predetermined length away from head 16. In one embodiment, structure 12 is completely cured before the axial growth length becomes equal to an external diameter of the matrix-coated reinforcement. In another embodiment, only an outer shell of structure 12 is cured before the axial growth length becomes equal to an external diameter of the matrix-coated reinforcement.

The matrix material and/or reinforcement may be discharged from head 16 via at least two different modes of operation. In a first mode of operation, the matrix material and/or reinforcement are extruded (e.g., pushed under pressure and/or mechanical force) from head 16, as head 16 is moved by support 14 to create the 3-dimensional trajectory within a longitudinal axis of structure 12. In a second mode of operation, at least the reinforcement is pulled from head 16, such that a tensile stress is created in the reinforcement during discharge. In this mode of operation, the matrix material may cling to the reinforcement and thereby also be pulled from head 16 along with the reinforcement, and/or the matrix material may be discharged from head 16 under pressure along with the pulled reinforcement. In the second mode of operation, where the matrix material is being pulled from head 16 with the reinforcement, the resulting tension in the reinforcement may increase a strength of structure 12 (e.g., by aligning the reinforcements, inhibiting buckling, compressing the matrix, ensuring distributed reinforcement loading, etc.), while also allowing for a greater length of unsupported structure 12 to have a straighter trajectory. That is, the tension in the reinforcement remaining after curing of the matrix material may act against the force of gravity (e.g., directly and/or indirectly by creating moments that oppose gravity) to provide support for structure 12.

The reinforcement may be pulled from head 16, as a result of head 16 moving away from an anchor point 20. In particular, at the start of structure formation, a length of matrix-impregnated reinforcement may be pulled and/or pushed from head 16, deposited onto anchor point 20, and cured such that the discharged material adheres (or is otherwise coupled) to anchor point 20. Thereafter, head 16 may be moved away from anchor point 20, and the relative movement may cause the reinforcement to be pulled from head 16. It should be noted that the movement of reinforcement through head 16 could be assisted (e.g., via internal head mechanisms), if desired. However, the discharge rate of reinforcement from head 16 may primarily be the result of relative movement between head 16 and anchor point 20, such that tension is created within the reinforcement. It is contemplated that anchor point 20 could be moved away from head 16 instead of or in addition to head 16 being moved away from anchor point 20.

A controller 22 may be provided and communicatively coupled with support 14, head 16, and any number of cure enhancers 18. Each controller 22 may embody a single processor or multiple processors that are configured to control an operation of system 10. Controller 22 may include one or more general or special purpose processors or microprocessors. Controller 22 may further include or be associated with a memory for storing data such as, for example, design limits, performance characteristics, operational instructions, tool paths, and corresponding parameters of each component of system 10. Various other known circuits may be associated with controller 22, including power supply circuitry, signal-conditioning circuitry, solenoid driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of lookup tables, graphs, and/or equations. In the disclosed embodiment, the maps may be used by controller 22 to determine the movements of head 16 required to produce the desired size, shape, and/or contour of structure 12, and to regulate operation of cure enhancers 18 (and/or other components of system 10) in coordination with the movements.

Figure 2:
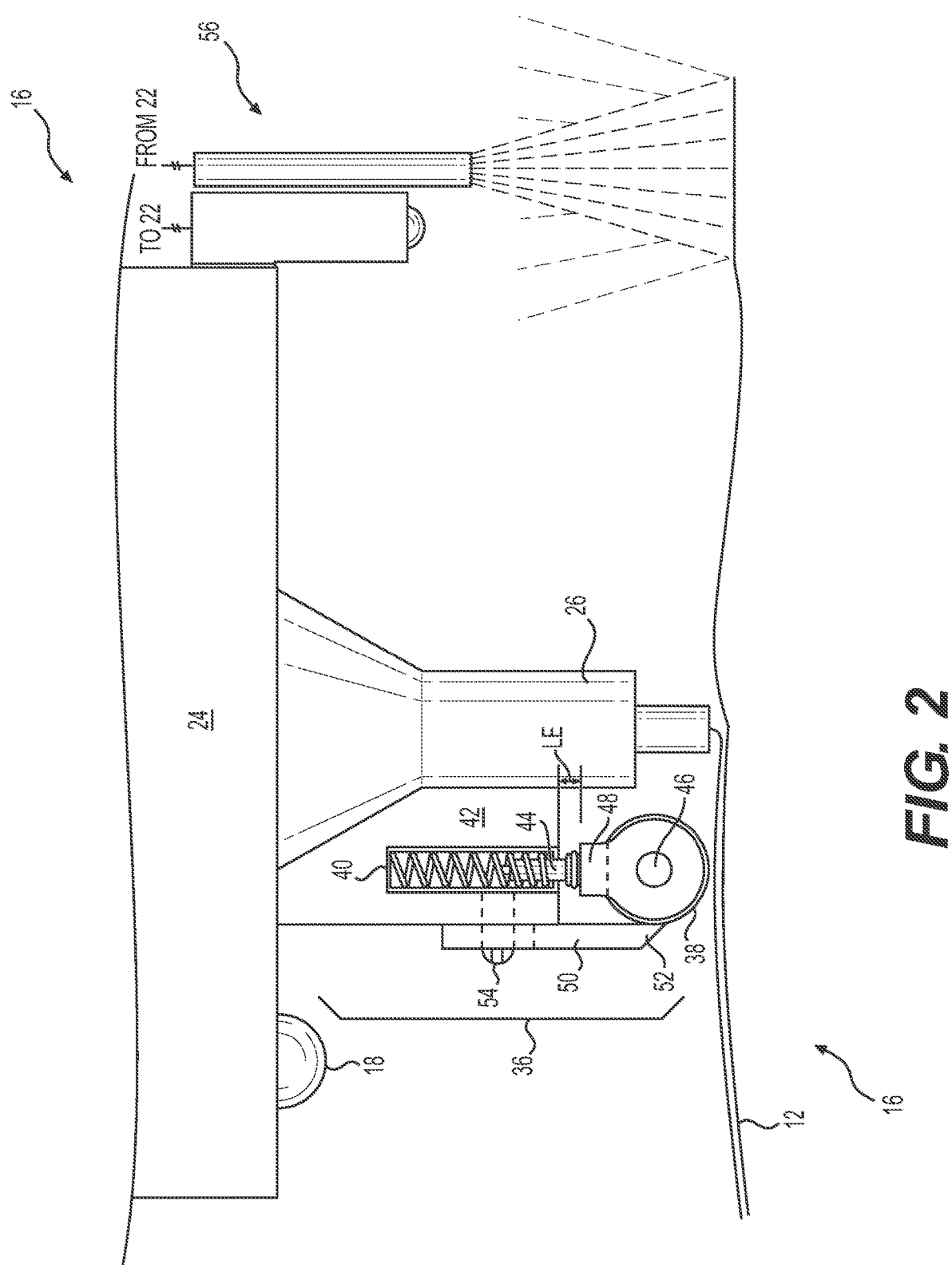
FIG. 2 is a side-view illustration of an exemplary disclosed print head that may be used in conjunction with the system of FIG. 1.

An exemplary head 16 is disclosed in detail in FIG. 2. Head 16 may include, among other things, a matrix reservoir 24, and a nozzle 26 removably and fluidly connected to matrix reservoir 24. In this example, nozzle 26 is single path nozzle configured to discharge composite material having a generally circular cross-section. The configuration of head 16, however, may allow nozzle 26 to be swapped out for another nozzle (not shown) that discharges composite material having a different shape (e.g., a tubular cross-section, a linear cross-section, a rectangular cross-section, a triangular cross-section, etc.).

Head 16 may include, in addition to cure enhancer(s) 18, matrix reservoir 24, and nozzle 26, a compactor 36. Compactor 36 may be configured to compact the matrix-coated reinforcement after discharge from nozzle 26 and before (and/or during) curing by cure enhancer(s) 18.

Compactor 36 may include a compacting wheel 38 that is biased against the matrix-coated reinforcement via a spring 40. Spring 40 may be disposed in a housing 42, and configured to exert an axial force on compacting wheel 38 via one or more pistons 44 that extend at least partially into housing 42. In the disclosed embodiment, compacting wheel 38 is generally cylindrical, with one piston 44 located at each opposing end. Each piston 44 may be connected to compacting wheel 38 via a corresponding bearing 46.

In the disclosed embodiment, the compacting force exerted by spring 40 on compacting wheel 38 (and subsequently on structure 12) is variable. For example, pistons 44 may have an adjustable effective length $L_e$, measured between spring 40 and compacting wheel 38. In the disclosed example, $L_e$ is adjustable by way of a threaded connection of piston 44 with bearing 46. Specifically, piston 44 may be unscrewed from bearing 46 (from an associated bearing housing) to make $L_e$ longer. Conversely, piston 44 may be screwed further into bearing 46 to make $L_e$ shorter. As $L_e$ becomes longer, spring 40 may be compressed by a greater amount, resulting in a larger biasing force pushing compacting wheel 38 harder against the wetted reinforcement. As $L_e$ becomes shorter, the spring 40 may be compressed by a lesser amount, resulting in a smaller biasing force pushing compacting wheel 38 harder against the wetted reinforcement. Piston 44 may be turned (e.g., screwed in or unscrewed) manually or automatically (e.g., via an associated actuator, such as an optional motor 48), as desired.

It is contemplated that other types and/or arrangement of actuators (e.g., hydraulic actuators, solenoids, etc.) may be used to automatically adjust $L_e$, if desired. For example, the same or additional threaded pistons 44 could be located at an opposing end of springs 40, within housing 42. These pistons would function to selectively push springs 40 out of housing 42 and towards compacting wheel 38.

It may be possible, in some applications, for cured or partially cured matrix material to build up on compacting wheel 38. For this reason, a scraper 50 may be affixed to compactor 36 in these applications. Scraper 50 may embody a blade, having a chiseled tip 52 located adjacent (e.g., at a tangential orientation) compacting wheel 38. A location of chiseled tip 52 may be adjustable (e.g., axially and/or radially, with respect to an axis of nozzle 26) to thereby vary an allowable thickness of the buildup on compacting wheel 38. In the depicted example, this location is varied manually by way of one or more set screws 54. It is contemplated, however, that other manual and/or automatic means of adjustment may be available. It is also contemplated that scraper 50 could be augmented with or replaced by a light shield or wiper, if desired, to reduce or inhibit resin from initially building up on compacting wheel 38.

In some embodiments, the compacting force of compactor 36 may be automatically adjustable (e.g., via adjustment of $L_e$) based on a parameter of structure 12 that is detected at a leading (e.g., relative to a travel direction of head 16) edge of head 16. The parameter may be detected via one or more sensors 56. Sensor 56 may be any type of sensor known in the art for detecting a parameter of a composite surface. The parameter may include, for example, a location, an orientation, a shape, a size, a material type, a hardness, an amount, a type of support on a side opposite head 16, etc. In the disclosed embodiment, sensor 56 is one of a lidar and a radar sensor. It is contemplated, however, that another type of sensor (e.g., a camera, a current sensor, an ultrasonic sensor, an infrared sensor, a stereoscopic optical-type sensor, etc.) could additionally or alternatively be utilized to detect the parameter of structure 12 and generate the corresponding signal. The signal may be directed to controller 22, which may responsively generate corresponding commands to adjust $L_e$ and the related compaction forces exerted by compacting wheel 38 as compacting wheel 38 moves over the previously detected region of structure 12.

For example, when a delicate (small-diameter and brittle) and/or unsupported region of structure 12 is detected, controller 22 may responsively reduce $L_e$. In another example, when a protrusion or excessive surface roughness is detected, controller 22 may responsively increase $L_e$.

INDUSTRIAL APPLICABILITY

The disclosed system and print head may be used to continuously manufacture composite structures having any desired cross-sectional shape and length. The composite structures may include any number of different fibers of the same or different types and of the same or different diameters, and any number of different matrixes of the same or different makeup. Operation of system 10 will now be described in detail.

At a start of a manufacturing event, information regarding a desired structure 12 may be loaded into system 10 (e.g., into controller 22 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), desired weave patterns, weave transition locations, etc. It should be noted that this information may alternatively or additionally be loaded into system 10 at different times and/or continuously during the manufacturing event, if desired. Based on the component information, one or more different reinforcements and/or matrix materials may be selectively installed and/or continuously supplied into system 10.

To install the reinforcements, individual fibers, tows, and/or ribbons may be passed through matrix reservoir 24 and nozzle 26. In some embodiments, the reinforcements may also need to be connected to a pulling machine (not shown) and/or to a mounting fixture (e.g., to anchor point 20). Installation of the matrix material may include filling head 16 (e.g., reservoir 24) and/or coupling of an extruder (not shown) to head 16.

The component information may then be used to control operation of system 10. For example, the reinforcements may be pulled and/or pushed along with the matrix material from head 16. Support 14 may also selectively move head 16 and/or anchor point 20 in a desired manner, such that an axis of the resulting structure 12 follows a desired three-dimensional trajectory. Cure enhancers 18 may be adjusted during operation to provide for desired curing conditions. Once structure 12 has grown to a desired length, structure 12 may be severed from system 10.

During operation of head 16, controller may continuously or periodically monitor a surface of structure 12 being fabricated. For example, controller 22 may compare surface characteristics (e.g., size, shape, location, roughness, compaction, etc.), as represented by signals from sensor(s) 56, to desired characteristics. Controller 22 may then selectively adjust $L_e$ based on the comparison (e.g., via activation of motor 48).

It will be apparent to those skilled in the art that various modifications and variations can be made to the disclosed system and print head. Other embodiments will be apparent to those skilled in the art from consideration of the specification and practice of the disclosed system and print head. It is intended that the specification and examples be considered as exemplary only, with a true scope being indicated by the following claims and their equivalents.

What is claimed is:

1. A print head for an additive manufacturing system, comprising:
    a matrix reservoir configured to hold a supply of matrix;
    a nozzle connected to an end of the matrix reservoir;
    a cure enhancer configured to expose a composite material being discharged from the nozzle to a cure energy; and
    a compactor located between the nozzle and the cure enhancer and configured to compact the composite material prior to exposure to the cure energy, the compactor including:
        a housing;
        a compacting wheel; and
        at least one spring disposed in the housing and configured to exert an axial force on the compacting wheel; and
    a sensor mounted at a leading side of the nozzle opposite the compactor and configured to generate a signal indicative of a surface condition of a structure being formed by the composite material.

2. The print head of claim 1, further including an actuator configured to selectively adjust a distance between the housing and the compacting wheel.

3. The print head of claim 1, further including a scraper mounted to the housing between the compacting wheel and the cure enhancer.

4. The print head of claim 2, wherein the actuator is automatically actuated based on the signal.

5. The print head of claim 1, wherein the surface condition includes at least one of a location, an orientation, a shape, a size, a material type, a hardness, an amount, and a type of support.

6. The print head of claim 1, wherein the sensor is one of a lidar sensor, a radar sensor, a camera, a current sensor, an ultrasonic sensor, an infrared sensor, and a stereoscopic optical-type sensor.

7. A system for additively manufacturing a composite structure, comprising:
    a nozzle configured to discharge a continuous reinforcement at least partially coated with a matrix;
    a support configured to move the nozzle during discharging;
    a compactor operatively connected to the nozzle and being adjustable to vary a compaction force exerted on the matrix-coated continuous reinforcement discharging from the nozzle;
    a cure enhancer configured to expose the matrix to a cure energy;
    a sensor mounted at a side of the nozzle opposite the compactor and configured to generate a signal indicative of a surface characteristic of the composite structure; and
    a controller configured to selectively cause adjustment of the compactor based on the signal.

8. The system of claim 7, wherein the surface condition includes at least one of a location, an orientation, a shape, a size, a material type, a hardness, an amount, and a type of support.

9. The system of claim 7, wherein the sensor is one of a lidar sensor, a radar sensor, a camera, a current sensor, an ultrasonic sensor, an infrared sensor, and a stereoscopic optical-type sensor.

10. The system of claim 7, wherein the compactor includes:

a compacting wheel;

a spring biasing the compacting wheel toward the matrix-coated continuous reinforcement;

an actuator selectively energized by the controller to affect a force of the spring.

11. A system for additively manufacturing a composite structure, comprising:

a print head configured to discharge a continuous reinforcement at least partially coated with a matrix;

a support configured to move the print head during discharging;

a compactor operatively connected to the print head and being adjustable to vary a compaction force exerted on the matrix-coated continuous reinforcement discharging from the print head;

a sensor mounted at a side of the print head opposite the compactor and configured to generate a signal indicative of a surface characteristic of the composite structure; and a controller configured to selectively cause adjustment of the compactor based on the signal.

12. The system of claim 11, further including a cure enhancer configured to expose the matrix to a cure energy.

13. The system of claim 12, wherein the cure enhancer is configured to expose the matrix to the cure energy at a location trailing the compactor.

14. The system of claim 11, further including a scraper mounted between the compactor and the cure enhancer.

15. The system of claim 11, wherein:

the signal is indicative of an unsupported region of the composite structure; and the controller is configured to responsively adjust the compactor to exert a lower compaction force.

16. The system of claim 11, wherein:

the signal is indicative of a protruding region of the composite structure; and the controller is configured to responsively adjust the compactor to exert a higher compaction force.

17. The system of claim 11, wherein:

the signal is indicative of an excessive surface roughness of the composite structure; and the controller is configured to responsively adjust the compactor to exert a higher compaction force.

18. The system of claim 6, further including a scraper mounted between the compactor and the cure enhancer.

* * * * *